Patented July 23, 1929.

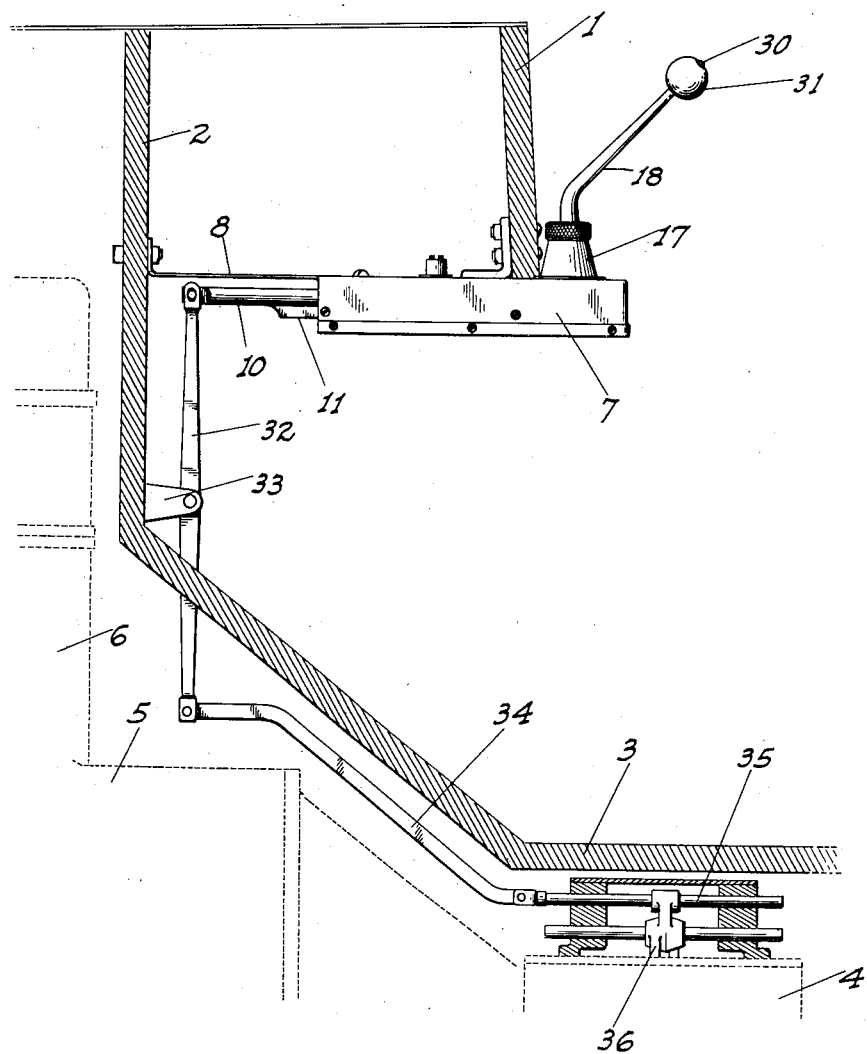

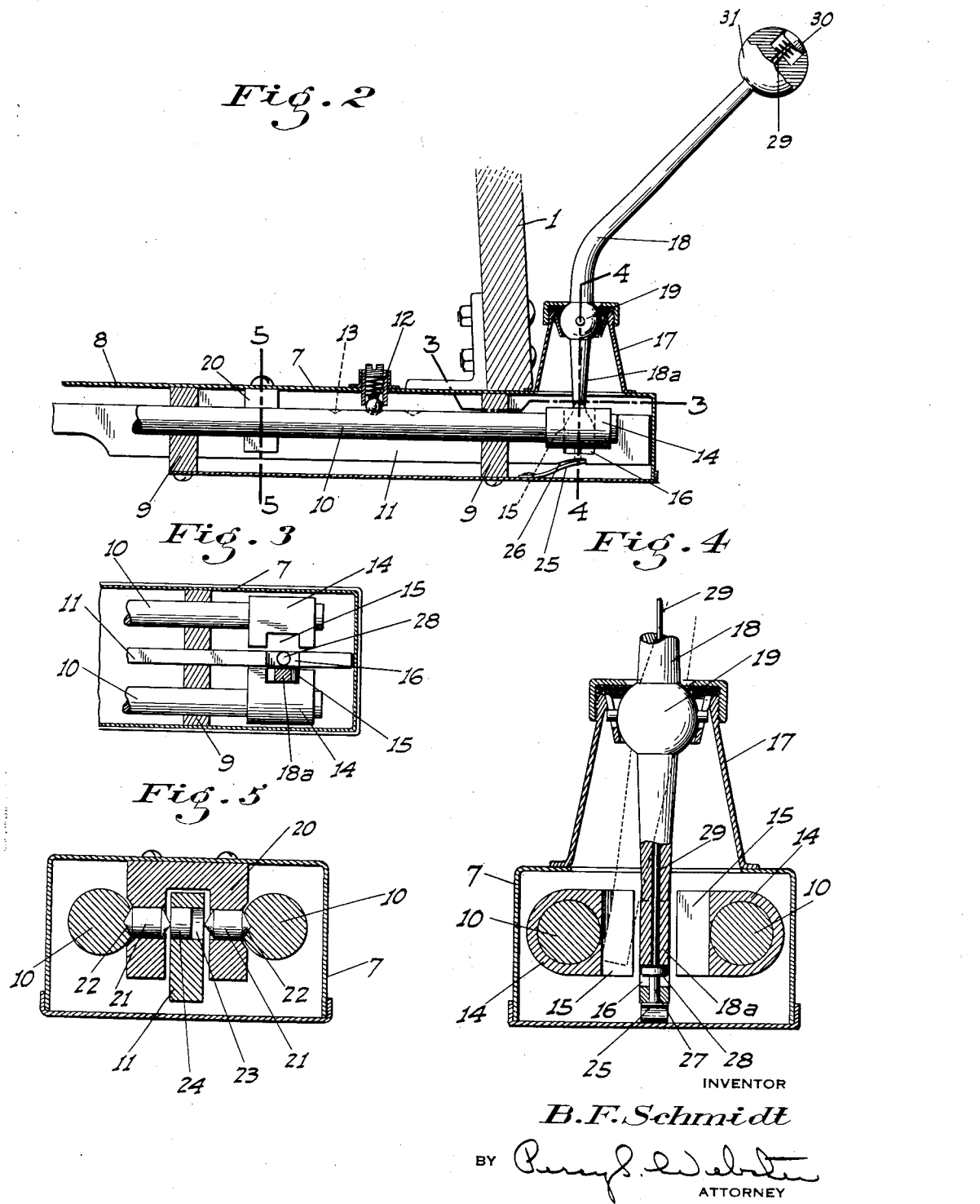

1,721,672

UNITED STATES PATENT OFFICE.

BENJAMIN F. SCHMIDT, OF LOS ANGELES, CALIFORNIA.

FOUR-SPEED GEAR-SHIFT MECHANISM FOR MOTOR VEHICLES.

Application filed July 5, 1927. Serial No. 203,526.

This invention relates to improvements in gear shift mechanisms for motor vehicles, and particularly to one for use in trucks and other motor vehicles which make use of the so-called four speed transmissions, in which four forward speeds are provided in addition to the reverse speed. My principal object is to provide a structure for the purpose having a novel shifting mechanism to enable proper shifting connections being readily made with the different units in a four speed gear case, with the use of a single shift lever mounted on the dashboard of the vehicle instead of projecting upwardly from the floor as is now customary. The advantage of thus mounting the lever is obvious and is discussed in my co-pending application for patent, Serial No. 160,365, filed January 11th, 1927, which matured into Patent Number 1,688,750; to which the structure of the present invention is similar in its general mounting and arrangement.

A further object of the invention is to provide a novel form of automatically operating locking means between the different shiftable gear controlling members, so that when one such member is moved the others will be positively held against movement.

The movable member which controls the operation of the fourth speed is not apt to be so much in use as the ordinary speed control members, and a further object of the invention therefore is to provide a manually released locking means for normally preventing this fourth speed member from being moved unless it is the definite intention of the operator to so move it. This feature will allow the shift members most generally used to be easily manipulated without danger of the fourth speed member being inadvertently moved.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved structure as installed in a motor vehicle.

Fig. 2 is a sectional elevation of the shift rod and lever structure.

Fig. 3 is a fragmentary plan section of the structure taken on the line 3—3 of Fig. 2.

Fig. 4 is an enlarged cross section taken on the line 4—4 of Fig. 2.

Fig. 5 is a similar view to show the automatic locking means taken on the line 5—5 of Fig. 2.

Referring now more particularly to the characters of reference on the drawings, the numeral 1 denotes the dashboard of a motor vehicle; 2 the engine bulkhead which as usual is a certain distance ahead of the dashboard; 3 is the floor of the driver's compartment of the vehicle; 4 the transmission housing under the floor; and 5 is the flywheel housing of the engine 6, said housing being located under the bulkhead 2.

Disposed directly under the dashboard 1 and rigidly secured thereto is a horizontal casing 7 which projects both ahead and to the rear of the dashboard a certain distance. At its forward end the casing has a horizontal extension 8 which projects and is secured to the bulkhead 2. The casing is provided with longitudinally spaced bearing and guide blocks for a pair of horizontal transversely spaced shifting rods 10 and a shifting bar 11 of preferably rectangular form which is disposed between said rods. The rods are movable longitudinally both ways from a certain neutral position, while the bar is intended to be shifted only one way from such neutral position. The rods control the shifting of the usual low, intermediate, high and reverse gears, while the centrally located bar is to control the so-called fourth speed gears. Each rod is maintained in any position to which it may be moved by a spring pressed ball 12 mounted in the casing and adapted to engage properly engaged notches 13 in the rod. Rearwardly of the rear bearing block 9 the rods are provided with bosses 14 having open sided and topped recesses 15 facing the bar, while the latter has a deep transversely extending recess 16 cut down from the top face thereof. The recesses of the bosses and bar are all transversely alined when said rods and bar are in a neutral position. Projecting upwardly from the casing rearwardly of the dashboard and vertically alined with the recesses is a hollow tubular member 17 which forms a support for the operating lever 18 which intermediate its ends has a ball 19 seated in said member for universal movement in the customary manner. The lower end 18ª of the lever is of a size to fit properly in the different recesses, and its width is such that when said lever is rocked to one side or the other so that said lower end will enter one of the recesses 15, said end will then clear the adjacent top edge of the bar, as indicated in Fig. 4. This enables the rods to be shifted without interfering with the bearings, as will be evident. The width of the lower end of the lever is also such that when said lever is vertically disposed it will engage the bar recess without interfering with the rod-bosses.

To prevent movement of the other longitudinally movable members when the remaining member is being shifted I provide the following structure:

Mounted in the casing preferably near one of the bearing blocks is a transverse yoke 20 which projects between the rods and straddles the central bar. Slidable in the yoke on each side of the bar are transverse horizontally alined but separated pins 21 which are tapered on their ends to seat in notches 22 in the rods and in an orifice 23 in the bearings, said notches and orifice being transversely alined when the different members are in their neutral position. When the pins are both seated in the rod notches the opposite ends of the pins just clear the corresponding side faces of the bar and do no project into the orifice. Slidable in the orifice (which extends completely through the bar from side to side) is a block 24, whose width is less than the thickness of the bar to an extent equal to the amount either pin projects into its rod notch.

Referring to Fig. 5, it will therefore be seen that with the pins in the positions shown, shifting of the bar so that the orifice passes beyond the pins, will cause the latter to be immovably maintained in engagement with the rods until the bar is returned to its neutral position. Said rods cannot therefore move while the bar is being shifted or as long as it remains in a shifted position. If the lever hand rod for instance is shifted the longitudinal movement of said rod causes the corresponding pin to be retracted from its socket in the rod and forced into the bar orifice. This causes the block 23 to be shifted toward the other side of the bar, maintaining the other pin engaged with the corresponding rod. Both the bar and said other rod are therefore held against movement until the rod being shifted has returned to its neutral position. Shifting of the other rod will effect a like result with a reverse movement of the block 24.

When the lever is in a neutral position and is vertically disposed the lower end of said lever then rests in the recess of the central bar. In order then to prevent a possible shifting of the central bar when it is intended to engage either of the side rods (which are more apt to be used than the fourth speed member) I provide the following catch structure for said bar.

Mounted in the casing under the bar is a depressible spring 25, arranged to normally seat in a notch 26 cut in the under face thereof, said spring and notch being arranged to prevent a movement of the bar in a gear shifting direction. The notch is disposed directly under the recess 16. Projecting upwardly from the bottom of the notch and extending through the portion of the bar therebelow to engage the spring is a plunger pin 27 having a head 28, the pin and head being arranged for vertical movement. A flexible wire 29 or the like extends through the operating lever from end to end, said wire having a button 30 on top seated in a suitable recess provided in the head 31 of the lever. A depression of the button therefore causes a downward movement of the wire. This depresses the head 28, moving the spring 25 clear of the notch and permitting the bar to be shifted. As soon as the bar initially moves, the pressure on the button may be released. The wire having no direct connection with the plunger no interference with the lateral shifting of the lower end of the lever from the bar recess to either of the rod recesses is had.

Various means may be used to connect the rods and bar with the corresponding shifting rods of the transmission structure, such for instance as is shown in my co-pending application above mentioned, or in my co-pending application Serial No. 209,242, filed July 29, 1927.

In the present instance however I show the rods and bar as being each independently connected at its forward end to a vertical lever 32 which is pivoted intermediate its ends onto the bulkhead 2 by a bracket 33, said lever projecting through the floor. The lower end of the lever terminates under the floor some distance above the fly-wheel housing and is connected by a link 34 to a horizontal rod 35 which is slidably mounted in the transmission structure 4 and which is rigidly connected to the corresponding gear shifting fork 36.

While I have shown and described the housing 7 and rods therein as being horizontally disposed, it will be obvious that this is not essential, since the structure would operate equally well if set with either an upward or downward angle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a gear shift mechanism, a longitudinally movable member having a recess in one horizontal face, a shift lever mounted in connection with said member and one end of which normally engages said recess, a spring catch normally engaging the face of the bar opposite to the recess, a plunger mounted in the bar to engage the spring and projecting from the bottom of the recess, and a hand depressed member projecting through the lever to the lower end thereof to engage and depress the plunger.

2. A gear shift mechanism for a motor vehicle including a longitudinally movable rod, means for supporting said rod in a substantially horizontal position from the dashboard of the vehicle, an upstanding shift lever to engage and shift the rod mounted on said supporting means, a vertical lever pivoted intermediate its ends onto the vehicle ahead of the dashboard, the forward end of said rod being directly connected to the upper end of the vertical lever, and a single rigid member directly connected to the lower end of the said lever and the corresponding gearshift element of the transmission of the vehicle.

In testimony whereof I affix my signature.

BENJAMIN F. SCHMIDT.